(12) United States Patent
Pu et al.

(10) Patent No.: US 6,373,967 B2
(45) Date of Patent: Apr. 16, 2002

(54) BIOMETRIC COMBINATION LOCK

(75) Inventors: Allen Pu; Demetri Psaltis, both of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/757,045

(22) Filed: Jan. 8, 2001

Related U.S. Application Data

(62) Division of application No. 09/323,558, filed on Jun. 1, 1999, now Pat. No. 6,229,906, which is a division of application No. 08/687,259, filed on Jul. 25, 1996, now Pat. No. 5,933,515.

(51) Int. Cl.⁷ .............................................. G06K 9/00
(52) U.S. Cl. ...................... 382/115; 340/5.52; 340/5.82
(58) Field of Search .............................. 382/115, 116, 382/124; 340/5.2, 5.52, 5.53, 5.8, 5.81, 5.82, 5.83

(56) References Cited

U.S. PATENT DOCUMENTS

| | | | | |
|---|---|---|---|---|
| 4,729,128 A | | 3/1988 | Grimes et al. ................. | 382/58 |
| 4,805,222 A | | 2/1989 | Young et al. .................. | 382/2 |
| 4,993,068 A | * | 2/1991 | Piosenka et al. ....... | 340/825.34 |
| 5,055,658 A | * | 10/1991 | Cockburn ................... | 235/382 |
| 5,202,929 A | * | 4/1993 | Lemelson .............. | 340/825.31 |
| 5,337,043 A | | 8/1994 | Gokcebay .............. | 340/825.31 |
| 5,339,305 A | | 8/1994 | Curtis et al. ................. | 369/112 |
| 5,386,104 A | * | 1/1995 | Sime .............................. | 902/3 |
| 5,513,272 A | * | 4/1996 | Bogosian, Jr. .............. | 382/116 |
| 5,557,686 A | * | 9/1996 | Brown et al. ............... | 382/115 |
| 5,594,806 A | * | 1/1997 | Colbert ........................ | 382/115 |
| 5,613,012 A | * | 3/1997 | Hoffman et al. ............ | 382/115 |
| 5,615,277 A | * | 3/1997 | Hoffman ..................... | 382/115 |
| 5,648,648 A | * | 7/1997 | Chou et al. ................. | 235/382 |
| 5,719,950 A | * | 2/1998 | Osten et al. ................. | 382/115 |
| 5,815,252 A | * | 9/1998 | Price-Francis .............. | 382/115 |
| 6,229,906 B1 | * | 5/2001 | Pu et al. ..................... | 382/116 |

FOREIGN PATENT DOCUMENTS

| | | | | |
|---|---|---|---|---|
| JP | 404135291 | * | 5/1992 | .................... 902/3 |

* cited by examiner

*Primary Examiner*—Bhavesh Mehta
(74) *Attorney, Agent, or Firm*—Fish & Richardson P.C.

(57) ABSTRACT

An identification system using biometric information of human body parts and a secret sequence code. In particular, biometric information of human body parts is used to form the secret sequence code. Specifically, a combination entry device recognizes user's fingerprints which are entered as a sequence. The fingerprints must be entered in the proper sequence in order to be recognized by the system. The fingerprints are preferably recognized using a fast technique with a low-probability level of rejection. While the sensor can be fooled for any one fingerprint. The use of a plurality of different fingerprints improves the identification capability. In particular, the combination of fingerprints in the proper order is necessary to undo the lock.

6 Claims, 4 Drawing Sheets

BIOMETRIC COMBINATION LOCK

This application is a divisional (and claims the benefit of priority under 35 USC 120) of U.S. application Ser. No. 09/323,558, filed Jun. 1, 1999, now U.S. Pat. No. 6,229,906, which is a divisional of U.S. application Ser. No. 08/687,259, filed Jul. 25, 1996, now U.S. Pat. No. 5,933,515. The disclosure of the prior application is considered part of (and is incorporated by reference in) the disclosure of this application.

FIELD OF THE INVENTION

The present invention teaches a technique of identifying a user through sequential input of human body part information. More specifically, the present invention teaches a technique of recognizing a specified sequence of user's fingerprints as a key to identification of the person.

BACKGROUND OF THE INVENTION

Biometrics is a study of using a physical trait in a human body part for verifying identity. Various techniques in the art have been suggested including recognition of fingerprints, recognition of retinal scans, palm prints, DNA traces, and others. Each of these human body part identification techniques has its own host of limitations.

Fingerprint identification is extremely reliable, when used properly. However, proper identification of a fingerprint requires massive amounts of computer power. A reasonably-sized computer system might take two to three seconds to identify a fingerprint with a reasonable degree of certainty. Moreover, smudges and other imperfect entry of fingerprint information can often leave traces which hinder accurate verification of the fingerprints.

Users rapidly lose patience with any system that gives them a false rejection. Hence, it is often desirable to leave the logic "wide open"; that is to allow recognition of a fingerprint with only a minimal degree of matching relative to the stored original. This tradeoff makes it less likely that a proper fingerprint will be erroneously rejected. However, it makes it more likely that an improper fingerprint will be erroneously recognized as being proper. The processing necessary to make a rough identification of such a fingerprint is less than that necessary to make a detailed identification, allowing a quicker recognition.

Some have suggested that a fingerprint detection system, especially a loose-logic system like the above-described, could be bypassed by taking a photocopy of a fingerprint of an appropriate type. Others have grotesquely suggested cutting off the user's finger or keeping the user as a captive in order to use their fingerprint.

The same problems do not exist in a personal identification system based on confidential personal identification numbers (PINs). Conventional ways to form a PIN include using a series of numbers, or a series of alphabetic letters, or a combination of letters and numbers. A secret PIN is known only by the user. Detection of the entry of the correct PIN is relatively simple. The system cannot be fooled by a fake PIN. However, various techniques are available to obtain a PIN surreptitiously. The user can be forced to tell the PIN number to another. A PIN number can be observed, e.g. by watching the user enter it. Since any user-can enter the PIN number, its security depends on secrecy.

It is an object of the present invention to adapt the systems described above. Specifically, the present inventors devised a system which uses some features in body parts for identification and in addition implements a secret code formed by a sequence of body parts to further enhance the identification. The inventors believe that use of the unique coding features in a user body part verification, in conjunction with the secrecy of personal identification numbers combines some of the best features of both identification systems. The logic can be left wide open (i.e., a loose-logic) to allow quick recognition of body parts, e.g., fingerprints. The present invention, however, goes against the established teaching in a biometric identification system to further make a positive identification by requiring that secret information be entered as a part of the biometric information, e.g., a secret sequence formed by fingerprints.

The inventors recognized the distinct advantages of a biometric identification systems by employing some bio-components in human's body parts to obtain certain information usually unique only to a particular person. The body parts used in the present invention are readily available to the user at anytime and anywhere. The present invention uses fingerprints in preferred embodiments disclosed herein to exemplify the concept of the invention.

The inventors recognized that multiple bio-components of a person can be used for redundancy and enhancing the possibility of a positive identification. Multiple fingerprints of a person to be identified, for example, are used in the present invention to obtain multiple matches in comparison of the entered fingerprints with the fingerprints of a user stored in a database.

Importantly, the inventors recognized the limitations in various biometric identification systems including system processing speed, identification ambiguity, and security. In particular, the inventors recognized the identification ambiguity and security issues in fingerprint identification. The present invention implements a novel personal identification coding system with a sequence code of bio-components of human body parts. Use of sequence codes formed by body parts in accordance with the present invention significantly increases the possibility of a positive identification and provides additional security against unauthorized use of body parts. Moreover, sequence codes of the present invention allows a coarse recognition in body part recognition without compromising the system performance. This reduces the computation that is required to positively recognize body features.

In the preferred embodiments of the present invention, multiple fingerprints of a person (e.g., three fingerprints of a person) are entered and processed to identify a particular user in the system database. A confidential sequence code constructed by multiple fingerprints is used to make a final positive identification of the user. For example, a sequence is formed by five fingerprints selected from three different fingers of a user. Examples of various encoding methods are described herein.

The inventors further recognized the importance of tamper-resistance in such identification systems. In order to be positively recognized by the system of the present invention, an intruder's bio-components in body parts, e.g., fingerprints, must be very similar to a user's information stored in the system database. Even if the intruder obtains a false fingerprint or a user's real fingerprints, or somehow fools the identification system in fingerprint matching, the intruder still does not know the secret information, e.g., the proper personal identification code. Moreover, even if the intruder were to observe a user entering the secret code, the intruder still would not be able to re-enter that code, because the intruder needs the body part for a biometric matching (e.g., a matching of fingerprints).

In addition, the inventors recognized the technical problems and challenges in biometric identification systems which compare entered bio-components of human body parts (e.g., fingerprints) with the corresponding data of a user in the system database. For example, large amount of data is to be processed in such a system identifying fingerprints since images of entered fingerprints are compared with stored images in the system database and specially in a large database common in many commercial applications. Electronic processing techniques often take a long time to correlate the input fingerprint images with the stored images in the database due to the limitations of the microprocessors and the serial processing nature.

One aspect of the present invention defines using the parallel processing capability as well as the fast processing speed of an optical correlator to significantly increase the processing speed of the identification system disclosed herein. In particular, multiplexed volume holographic storage media are used in the optical correlator incorporated in the present invention for fast data accessing and image processing.

The present invention can also be applied to electronic processing systems that use Digital Signal Processing (DSP) algorithms for matching body features. One unique aspect of such a system is that it can leave the logic wide open in matching body features to reduce the computational time while still retaining the high security of the system by using secret sequence codes formed with body parts.

BRIEF DESCRIPTION OF THE DRAWINGS

These and other aspects of the present invention will become apparent in the detailed description herein with reference to the following accompanying drawings, in which.

DETAILED DESCRIPTION OF THE INVENTION

The preferred embodiment of the present invention describes a method of identifying a person by using both a physical trait in a body part of the person and a personal identification sequence code that is formed by using the physical trait thereof. The present invention further discloses various systems including one with optical processors to implement the method. Fingerprints will be used to exemplify the concept and the spirit of the invention in the detailed description hereinafter and should not be construed as limitations of the invention.

Biometric traits, such as fingerprints, often have features or information which are uniquely associated with a particular person. It is known that fingerprints can be used for identification. Conventional fingerprint identification methods compare a fingerprint of a person with authorized fingerprints stored in a template database. There are uncertainties in such a matching process due to various reasons: including possible similarities of fingerprints from different people and an improper entry of a fingerprint.

One embodiment of the present invention improves the accuracy of fingerprint identification by using multiple fingerprints of a person for redundancy. This reduces the possibility of erroneous matching as well as erroneous mismatch. In addition, secret information is formed by using body parts for further identification in the present invention. As an example, at least one fingerprint is used to form a secret sequence code in preferred embodiments. The secret sequence codes of the present invention allow using loose-logic in fingerprint recognition so that an imperfect matching relative to a stored original fingerprint is permitted. According to the present invention, this makes it less likely that a proper fingerprint will be erroneously rejected. The loose-logic thereabove is tightened afterwards by use of both the secret sequence codes and multiple fingerprints. This increases the overall processing speed, since the processing necessary to make a rough identification is usually much less than that necessary to make a real identification in fingerprint recognition. Other advantages of the fingerprint sequence codes include their superiority over conventional PINs in both the accuracy and security.

Figure 1:
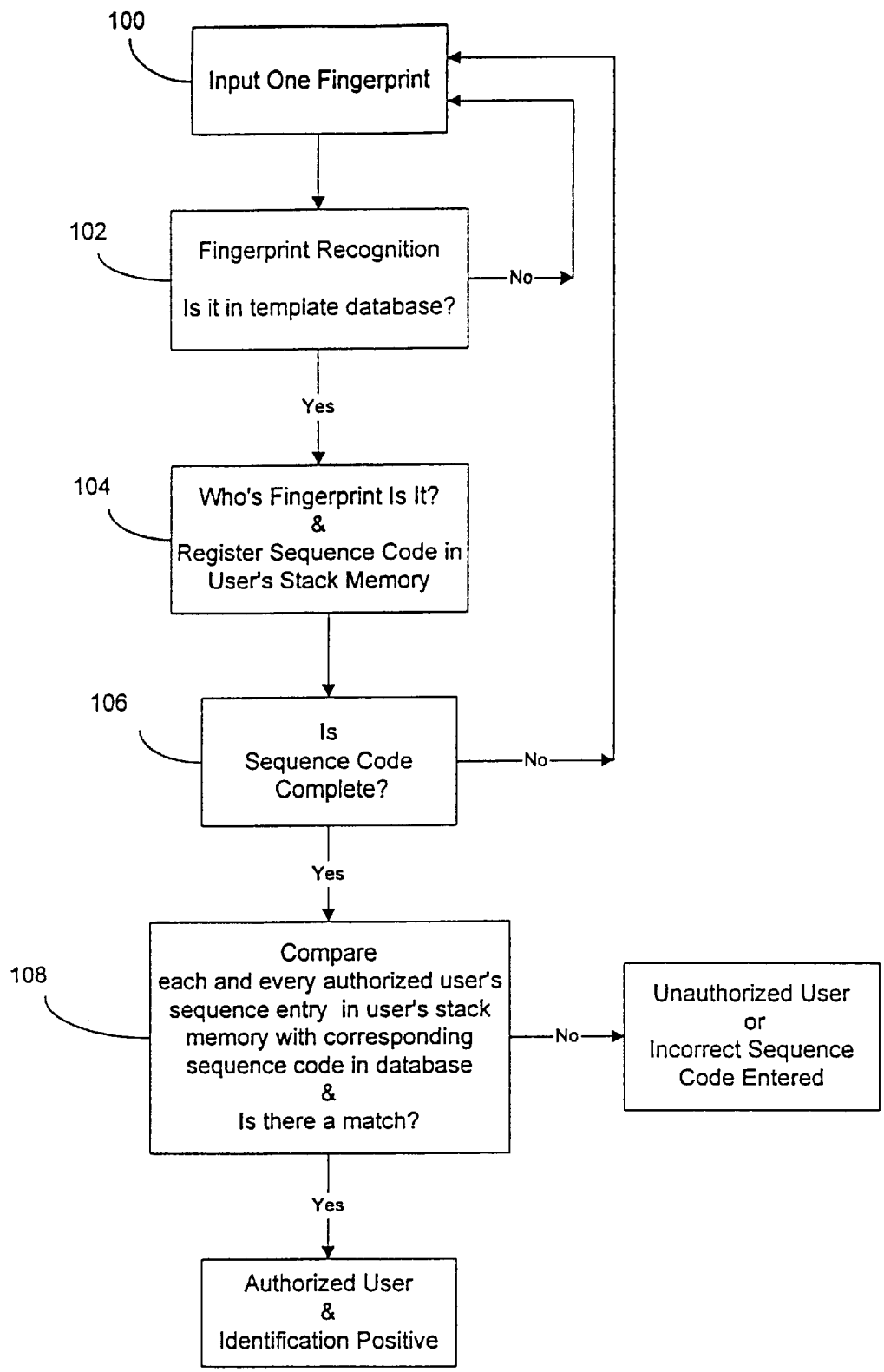
FIG. 1 is a flow chart showing the basic components of a first identification method in the present invention.
Figure 2:
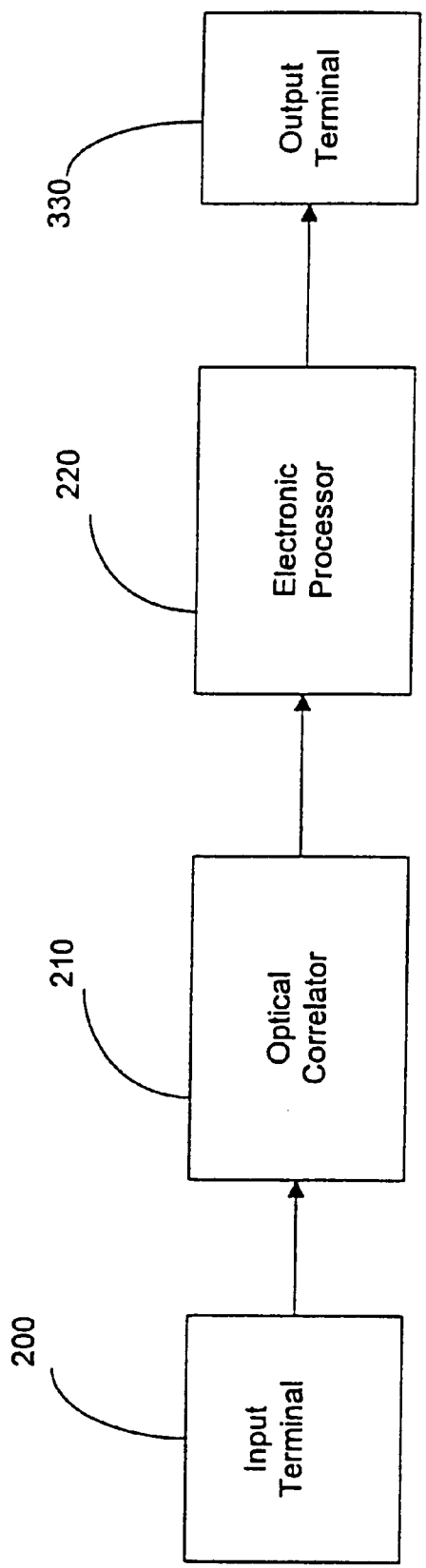
FIG. 2 shows a block diagram of a hybrid identification system based on the present invention using an optical correlator.
Figure 3:
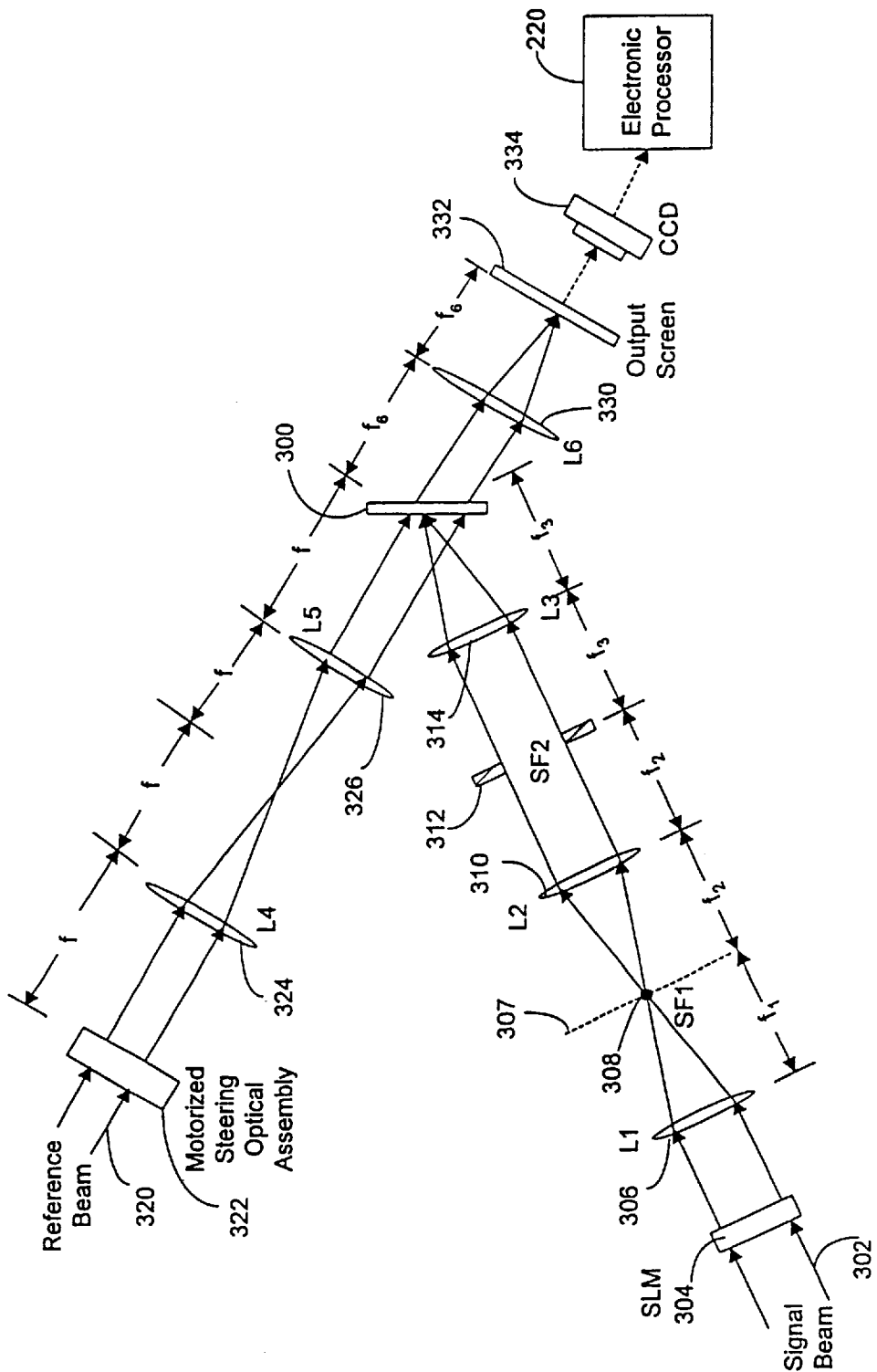
FIG. 3 shows an example of optical correlators used in the present invention.
Figure 4:
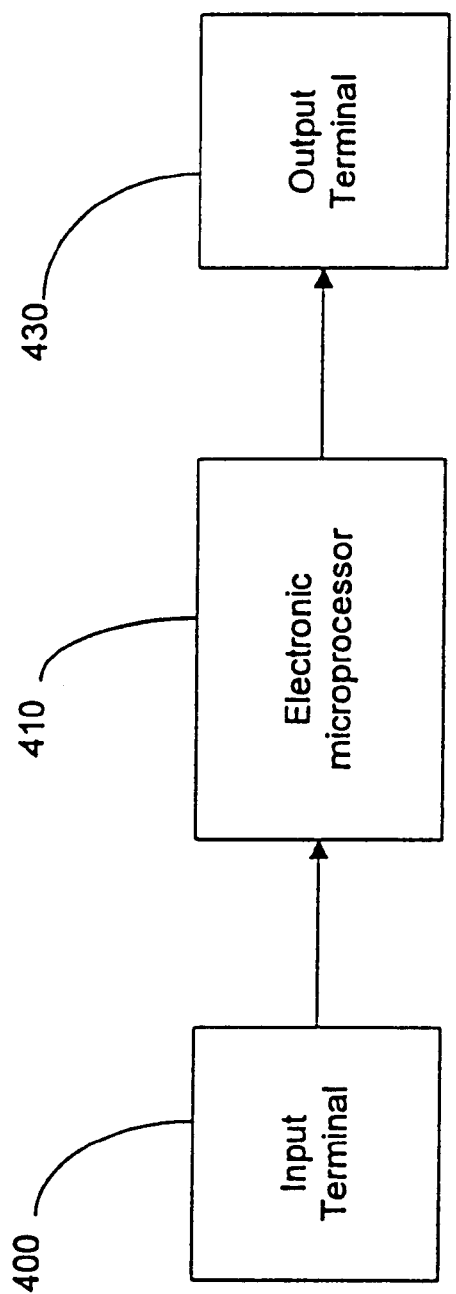
FIG. 4 shows a block diagram of an electronic implementation of the present invention.

FIG. 1 shows a preferred embodiment of the above identification system using fingerprint sequence codes in the present invention. The process illustrated in FIG. 1 is implemented by various systems disclosed herein, examples of which are shown in FIGS. 2, 3, and 4. The system includes a template database with a plurality of different fingerprints from authorized users, a sequence code database with secret sequence codes of all authorized users, and a user stack memory having blank spaces for authorized users to store the corresponding secret sequence code. According to the present invention, different authorized users have different secret sequence codes and one user's secret sequence code is not known by another user.

The system of the present invention examines whether a user to be identified is in the template database by comparing at least one fingerprint entered by the user with the stored fingerprints of authorized users. The disclosed system further checks whether or not the user's entered sequence code matches the secret sequence code kept in the sequence code database from one authorized user whose fingerprints match the user's. Furthermore, the system is constructed to minimize the processing time and thereby to simulate a "real-time" identification process.

A user to be identified first enters one fingerprint at the process 100. The entered fingerprint is compared with the fingerprints of the authorized users stored in the template database in fingerprint identification process 102. If there is no match, the user is not recognized. If there is at least one match, the system identifies which authorized user is matched and further registers the entered fingerprint as the first entry of a secret sequence code of the matched authorized user in the user stack memory. This completes step 104.

Next, the system checks if a sequence code is completed with the first entered fingerprint in step 106. If a sequence code is not completed, the system asks the user to be identified to enter a second fingerprint. The above process repeats until a complete sequence code is constructed with at least one entered fingerprint.

In step 108, the system compares entries of sequence codes in the user stack memory including unregistered blanks with their corresponding sequence code stored in the sequence code database. This comparison is performed for all authorized users in the database whether or not there is a fingerprint match between the entered fingerprints and the fingerprints in the sequence code. If the entered fingerprint sequence code matches the sequence code of the authorized user in the sequence code database, the system renders a positive identification and the user is considered an authorized user. Therefore, the user to be identified not only has entered correctly matched fingerprint(s) but also has entered the correct sequence code of the matched authorized user. If there is no match in sequence code comparison, the identification is negative and the user either is not in the database or has entered an incorrect sequence code.

More than one match will usually not occur because the system is designed in a way such that all authorized users in the database have different data, i.e., at least one dissimilar fingerprint and a unique sequence code. After an identification is made, the system resets the user stack memory to zero and is ready to process another user.

A secret sequence code for an authorized user is formed by a combination of fingerprints. The number of fingerprints to be entered is dependent on the sequencing method to construct the code. On the other hand, a particular sequencing method also affects the way that a fingerprint is entered. According to the present invention, there are many ways to form a sequence code using at least one fingerprint. The inventors list several embodiments of forming a fingerprint sequence code in the following in order to illustrate the concept of the present invention. It should be understood that the system described in the preferred embodiment could be used for any of these and other variations based on the concept and spirit of the present invention.

1. A Multiple-Fingerprint Sequential Code. A combination of a plurality of different fingerprints are used in this method to construct a sequence code. In particular, a sequence code is formed by a sequential order in which a combination is entered. For example, a code uses five fingerprints that is a combination of three different fingerprints.

One advantage of using a plurality of different fingerprints is redundancy. A fingerprint, like many other physical traits used in biometric identification, is usually uniquely associated to a particular person. The possibility of two people having one identical fingerprint is small. However, there is a possibility of two people have one similar though not identical fingerprint. Specially, the degree of similarity of a fingerprint between two people is dependent on the identification technique and device that are used. Employing multiple different fingerprints for identification further takes the advantage of uniqueness of fingerprints to minimize the possibility of two people having the same identity in the fingerprint identification system disclosed in the present invention. In addition, the present invention uses sequence codes formed with a plurality of different fingerprints to ensure the accuracy of an identification and security of the system.

2. A Fingerprint Morse Code. A user enters one; fingerprint for different time durations on the fingerprint input device. By removing and placing the user's fingerprint on the input device for a plurality of times with different duration, a fingerprint Morse Code is generated and then compared with the stored Morse Code of that particular user for positive identification. One fingerprint is sufficient for this method. An alternative technique uses one fingerprint for "dots" and a different one for "dashes". However, a plurality of different fingerprints are preferred to take advantage of redundancy.

3. A Spatial Sequence Code Using Multiple Different Fingerprints. A plurality of different fingerprints are entered in a input device simultaneously. The input surface of the input device is registered by the system. A sequence code is formed by the relative spatial order or position of the fingerprints on the input device.

4. An Orientation Sequence Code. At least one 30 fingerprint is entered sequentially for a plurality of times. A sequence code is formed by the different relative orientation at which a fingerprint is entered. For example, one fingerprint can be used to form a code by rotating the finger 90° at one sequential entry relative to another entry.

5. A Spatial/Sequential Code. This method forms a code by using positioning information in addition to the time sequence described in the first method of time sequence code. The input surface of the input device is registered by the system. A code is formed by two criterions, including the time sequence of a plurality of fingerprints that are entered and the relative positioning of the entered fingerprints on the input device. In this method, one fingerprint is entered at a time. Either one fingerprint or a plurality of different fingerprints can be used to form the sequence code.

According to the present invention, any of the above methods, any of other sequencing methods, and any combination thereof may be used to form a fingerprint sequence code. Variations on the total number of fingerprints and the number of different fingerprints in a sequence code are implied.

Various methods of recognizing an input fingerprint and different identification system implementations are contemplated in the present invention. FIG. 2 is one preferred embodiment of an identification system based on optical recognition of fingerprints. The system includes an input terminal 200, an optical correlator 210, an electronic processor 220, an output terminal 230 and other devices. The input terminal 200 can be any fingerprint reading device, e.g., a video camera with an imaging optics. The optical correlator 210 has a spatial light modulator (SLM) to capture an image of a fingerprint and imprints the image thereof on the wavefront of an optical signal beam via spatial light modulation. An optical memory unit having the template database with fingerprints of all authorized users is also included in the optical correlator 210. The input fingerprint carried on the signal beam is simultaneously compared with the template fingerprints of authorized users in the optical memory unit by optical interaction therewith. The electronic processor 220 stores the secret sequence codes of all authorized users that are associated with the fingerprints stored in the optical memory unit. The user's stack memory and the secret sequence code database are included in the electronic processor 220. The electronic processor 220 performs multiple tasks including registration of the entered fingerprint in the user's stack memory, sequence code identification based on the results from optical correlator 210, overall system monitoring, coordination and controlling. The output terminal 230 informs the user on instructions, processing status and results by a video display and/or an audio device. The input terminal 200 and the output terminal 230 can be integrated as one user interface unit.

The spatial light modulator (SLM) in the optical correlator imprints an input fingerprint on a laser beam. This can be done by first converting the image of a fingerprint into electrical signals with a photosensor and then modulating a laser beam with the electrical signals thereof. An example of such SLM is a liquid crystal display light valve. Another way is directly using a laser beam to impinge on the fingerprint and thereby to obtain the pattern of the fingerprint. The electronic processor 220 can be a microprocessor or microcontroller.

One significant advantage of the identification system in FIG. 2 is its use of an optical correlator 210 to perform fingerprint recognition. Fingerprint recognition requires processing a large amount of information due to the complex patterns of fingerprints and the nature of image processing. Electronic digital processing suffers in speed in performing such tasks because of the serial processing method and the limited computing power of current microprocessors. In contrast, an optical correlator can perform an image recognition using parallel processing at a speed close to the speed of light by using photons to carry information and by using holographic storage media that can be accessed in parallel fashion. In a practical fingerprint identification system for the processes shown in FIG. 1, the processing speed is important since a user can quickly loses patience and interest in using such a system that responds slowly.

An optical correlator that processes images with analog signals usually has a loose-logic due to cross correlations of different images and limited signal to noise ratios. This limits the use of optical correlators in many applications that require a positive identification in spite of the fast processing speed of such optical correlators. Since the present invention allows a loose-logic in fingerprint recognition by using both secret sequence codes and multiple fingerprints for further identification, an analog optical correlator can be used in practicing the present invention. This takes the advantage of the fast processing capability without compromise in identification performance.

FIG. 3 shows one preferred embodiment of such optical correlators suitable for the identification system depicted in FIG. 2. A coherent optical beam generated by a laser source (not shown) is split into reference beam 320 and a signal beam 302, both of which are collimated plane waves. Both beams are needed to record and update the fingerprints of an authorized user in a template database stored in a holographic medium 300. Only the signal beam 302 is needed to perform an identification process.

The image of a user's fingerprint is imprinted on the signal beam 302 by a spatial light modulator (SLM) 304. A lens 306 Fourier-transforms the image on the SLM 304 to the Fourier plane. Since the feature information of the input image is in the high spatial frequency components of the Fourier transform, the DC component at the center of the Fourier plane 307 is blocked by a spatial filer 308. Such DC filtering performs an edge enhancement in the input image. According to the present invention, the spacing between the SLM 304 and lens 306 can be an arbitrary distance but is preferably the focal length of lens 306. Lenses 310 and 314 form an imaging relay system to replicate the image in the Fourier plane 307 to the holographic medium 300. A spatial filter 312 is used to remove the components from the edges of the SLM 304. Such edge filtering by filter 312 is desirable to reduce the cross-correlation between different images since the edges of the SLM are common to all the input images.

The reference beam 320 is a collimated plane wave which does not carry image information. Reference beam 320 interferes with the Fourier transform of image-bearing signal beam 302 at the holographic medium 300 to record holograms therein to generate the template database for fingerprint identification. A motorized steering optical assembly 322 allows adjustment of the direction of the reference beam 320 to a 4f imaging system formed by lenses 324 and 326. The 4f imaging system images the reference beam 320 at 322 to the holographic medium 300 and maintains the illuminated area on the holographic medium 300 by the reference beam 320 unchanged while the direction of the reference beam 320 to the 4f system is changed. The motorized steering optical assembly 322 is controlled by the electronic processor 220 of FIG. 2.

The output portion of the optical correlator includes a Fourier-transforming lens 330, an output screen 332, and a CCD array 334. In particular, the CCD array 334 serves as an output interface from the optical correlator to the electronic processor 220. Various methods are used in the present invention to couple the output signal from lens 330 to the CCD array 334. For example, one way is to use a white screen as the output screen 332. Thus, the CCD array 334 is used to capture the reflected images from the screen instead of the transmitted signals as depicted in FIG. 3. In this method, the CCD array 334 is located on the same side of the screen 332 with the Fourier lens 330. Another example is to place the CCD array 334 directly at the Fourier plane of the lens 330. This eliminates the screen 332.

Both signal beam 302 and reference beam 320 are needed to store a fingerprint into the holographic medium 300 as the template database. The fingerprint to be stored is entered from the input terminal 200 which further sends the fingerprint image to SLM 304 in the optical correlator 210. The holographic medium 300 records the interference patterns of the reference beam 320 and the Fourier transform of the image of the input fingerprint. Both angle and fractal multiplexing techniques are employed to superimpose a plurality of different fingerprints in the same recording area of the holographic medium 300. Different fingerprints are recorded as holograms with the reference beam 320 at different angles controlled by the motorized steering optical assembly 322.

In addition, the same angle and fractal multiplexing mechanisms are used to spatially register a particular fingerprint of a particular user in the template database within the holographic medium 300 to a spot located on the output screen 332 that is uniquely assigned to the correlation peak corresponding to that fingerprint. The spatial location of a correlation spot corresponding to a fingerprint on the output screen 332 is further registered in the memory unit of the electronic processor 220 via a positioning registration of the CCD array 334 relative to the output screen 332. According to the present invention, the correlation peaks of different fingerprints appear at different locations on the output screen 332.

As described previously, the way that a fingerprint is entered, such as time sequence or spatial position at the input surface, forms the fingerprint sequence code of the present invention. After all the fingerprints of an authorized user are recorded in the holographic medium 300, a template database for that user is completed. In addition, the information of that particular user's fingerprint sequence code is also recorded and stored in a sequence code database in the electronic processor 220.

The above recording process is repeated to store the data for all-authorized users in the holographic medium 300 and the electronic processor 220. Thus a template database and a sequence code database for a plurality of users are established.

The optical diffraction efficiency of a hologram is inversely proportional to the square of the number of superimposed holograms in the same recording area. Therefore, there is a limit to the number of fingerprints that can be stored in one location in the holographic medium 300. One method to further increase the storage capacity is spatial multiplexing wherein multiple recording areas that are spatially separated or partially overlapped with each other are used to record holograms. Each recording area is recorded with a plurality of angle multiplexed and fractal multiplexed holograms. A mechanism must be in place to physically move that particular recording area into the signal beam 302 or vice versa to access the information in a particular recording area. One example of such mechanism is to spin the holographic medium 300 that is in a shape of a circular disk with a motor that is controlled by the electronic processor 220.

To identify a user, the reference beam 320 is turned off and the signal beam 302 is used for identity processing. The user to be identified enters fingerprints which are simultaneously compared with the fingerprints of authorized users in the holographic medium 300 by the optical correlator. The image of an entered fingerprint is Fourier transformed by the lens 306 and multiplied with the Fourier-transformed holograms of the template fingerprints in the holographic medium 300. Next, a inverse Fourier transform of the multiplication thereabove is performed by the Fourier lens 330. Therefore, the correlation pattern of the entered fingerprint and the template fingerprints is formed on the output screen 332 which is located in the Fourier plane of the lens 330.

A correlation peak appears on the output screen 332 if the entered fingerprint is similar to one template fingerprint in the database and is entered at a similar orientation of that template fingerprint. The brightness of a correlation peak is a function of the degree of similarity between the images and it increases if there is more similarity between the images. The electronic processor 220 identifies the entered fingerprint as a fingerprint belonging to the database if the intensity of the correlation peak is greater than a predetermined threshold value. The orientation of an input fingerprint is important because the optical correlator in FIG. 3 based on Fourier transform is rotation-variant. No correlation peak appears if a right fingerprint is entered at a wrong orientation or a wrong fingerprint is entered. Furthermore, as described thereabove, the location of a bright correlation spot on the output screen 332 indicates whose fingerprint and more specifically which fingerprint of that person is matched.

As a fingerprint is entered and compared against the authorized fingerprints in the template database, registration of a sequence code is made in the user' stack memory by the electronic processor 220. If there is a match, one space in the matched authorized user's stack is registered. Otherwise, no registration is made in the user's stack memory. After the user to be identified finishes entering all fingerprints, the electronic processor 220 compares the entries in the authorized user's stack memory with the corresponding sequence code in the database. The system performs this comparing process for all authorized users in the database to make either a positive or a negative identification of the user.

The optical correlator in FIG. 3 can be packaged in a compact unit by using miniature components and devices. For example, a compact diode laser or a diode-based solid-state laser can be used to produce the reference beam 320 and the signal beam 302.

Another optical correlator for implementing the present invention is an optical correlator based on four-wave mixing in a nonlinear holographic medium. In this optical correlator, three mutually coherent laser beams are required with a first beam being a plane wave, a second beam carrying an image to be identified, and a third beam carrying the images in the template database. The wave vectors of the three beams must meet the phase-matching criterion. The template database does not have to be prerecorded in the holographic medium. The Fourier transforms of the two image-bearing beams and the plane wave interact with each other through nonlinear mixing in the nonlinear holographic medium and generate a fourth output beam. The correlation signal is obtained by Fourier-transforming the fourth output beam. In particular, a joint transform correlator based on nonlinear four-wave mixing is advantageous for many applications since the template images can be updated in real-time.

FIG. 4 shows a preferred embodiment of the present invention using analog electronic image processing. The fingerprints of all authorized users are obtained, converted into digital form, and stored in the template database in the electronic processor 410. The user's stack memory and the secret sequence code database are also included in the electronic processor 410. In operation, an input terminal 400 converts the two-dimensional image of a fingerprint into electrical signal which is further transformed pixel by pixel into digital format. A microprocessor 410 compares the input fingerprint with the digital template database. The digital template database stores the fingerprints of authorized users in form of Fourier transform. The correlation process is carried out pixel by pixel as follows. A first pixel of the input fingerprint is Fourier-transformed and multiplied by the conjugate of the Fourier transform of the corresponding pixel in the template database. Next, the reverse Fourier transform of the multiplication is performed and thus a correlation for that pixel is completed. The above process repeats until all pixels are processed. A predetermined threshold intensity value for a positive correlation is used.

As a fingerprint is entered and compared against the authorized fingerprints in the template database, registration of a sequence code is made in the user' stack memory by the microprocessor 410. If there is a match, one space in the matched authorized user's stack is registered. Otherwise, no registration is made in the user's stack memory. After the user to be identified finishes entering all fingerprints, the electronic processor 410 compares the entries in the authorized user's stack memory with the corresponding sequence code in the database. The system performs this comparing process for all authorized users in the database to make either a positive or a negative identification of the user. Furthermore, various sequence coding methods can be used with the embodiment shown in FIG. 4 including, but are not limited to, the five methods described previously and any combination thereof.

The above-described preferred embodiment in FIG. 4 uses an analog processing technique to carry out image recognition with electronic devices as opposed to optical devices as in FIG. 3. Electronic processor 410 processes the image data from an entered fingerprint and stored template fingerprints of authorized users bit by bit in a serial fashion while the optical correlator in FIG. 3 processes all the image data simultaneously in parallel. According to the present invention, one alternative way to perform fingerprint recognition by electronic means is to use a digital signal processing (DSP) technique.

Only certain significant features of a fingerprint are obtained to form a digital representation of the fingerprint with DSP technique instead of every bit of information from the entire fingerprint. This significantly reduces the amount of data from a fingerprint without losing the essential information needed for identification. If an entered fingerprint has the same significant features as an authorized user in the template database, a positive identification is made. Multiple different fingerprint can be used for redundancy. According to the present invention, a correct sequence code formed by fingerprints is still needed in order for the system to make a final positive identification. A fast processing speed can be achieved since the total amount of data to be processed is significantly reduced.

In summary, the present invention uses a secret sequence code formed by information from human body parts to positively identify a user. A sequence code is entered by the user using body parts and is compared with a secured sequence code known only to that user. Any body parts can be used for identification and any methods can be employed to generate a sequence code. According to the present invention, a user is positively identified only if user has the right body parts and the correct sequence code formed by the body parts.

Although the present invention has been described in detail with reference to a number of particular embodiments, one ordinarily skilled in the art to which this invention pertains will appreciate that various modifications and enhancements may be made without departing from the spirit and scope of the present invention. Some examples of variations and ramifications in accordance with the present invention are listed as follows:

It should be understood that the combination entered could be based on any aspect of the human body part, including features of other body portions, retinal scans, and the like. In particular, different information indicative of one body part can be used in accordance with the present invention. In case of a finger, the information of pressure or temperature can be used instead of the fingerprint.

The inventors also contemplate that this system may be useable in operations that require multiple users to each acquiesce, such as in a combination lock requiring multiple user entry information. An entry from multiple users includes body features from each user.

Any body features and any method of sequence generation can be used. For example, iris scanning and fingerprints can be used in combination to achieve redundancy and a sequence code in the present invention.

The present invention can be practiced with any body feature input device (i.e., a thermosensor, a pressure sensor, a IR imaging device), any body feature recognition device (i.e., optical correlators, microcontroller, microprocessors or other digital computers), and any recognition algorithm (i.e., correlation, wavelet transforms, probabilistic match).

Other devices and algorithms for comparing an entered sequence code and an authorized one are implied.

The present invention also implies an identification system wherein body features such as fingerprints are used for a first stage of identification and a PIN formed by numerical numbers, alphabetic letters, or any combination thereof is used for a second stage of identification. A keyboard-type input device may be incorporated in the input terminal of the system to accommodate entry of letters and numbers.

All these and other modifications are intended to be encompassed within the following claims.

What is claimed is:

1. A human body-recognizing combination lock comprising:

a body part imaging device operable to obtain a plurality of images of one or more human body parts, said images having a spatial or temporal relationship with respect to one another;

an image comparing computational element, responsive to said images from said imaging device, and operable to compare said images against a set of reference images of said one or more human body parts of an authorized user according to a first pre-determined criterion to ascertain whether said images meet said first pre-determined criterion and to compare said relationship of said images against a reference relationship selected by said authorized user to determine whether there is a match according to a second pre-determined criterion, wherein said computational element is adapted to produce an output recognition signal only if both said both first and second pre-determined criteria are met wherein said computational element detects said images that are obtained at different times, said recognition signal being output only when all of said images meet said first pre-determined criterion in a proper sequential order according to said second pre-determined criterion.

2. The lock as in claim 1, wherein said body part imaging device includes a fingerprint identifier.

3. The lock as in claim 2, further comprising a memory device operable to store a plurality of images forming a database of allowable fingerprints to be recognized from a plurality of authorized users.

4. A combination detecting apparatus comprising:

a body part information device, receiving information indicative of a body part, and producing an output signal indicative of said information about said body part; and a recognizing device, connected to receive said information, and to compare said information against pre-determined criterion, said pre-determined criterion having a probability of success which is not sufficient to allow said pre-determined criterion to be used by itself, said computing element comparing said images received at least three different times against said pre-determining criterion, and outputting a signal indicative of proper recognition only when said at least three signals are correctly recognized in a correct order.

5. The apparatus as in claim 4, wherein said body part information device includes a fingerprint identifier.

6. The apparatus as in claim 4, wherein said body part information device includes a device that identifies a biometric feature other than a fingerprint.

* * * * *